J. H. GOLDHART.
MILK-COOLER.

No. 179,783. Patented July 11, 1876.

WITNESSES
W. J. Read
E. H. Bates

INVENTOR
John H. Goldhart
Gilmore, Smith & Co.
ATTORNEYS.

UNITED STATES PATENT OFFICE.

JOHN H. GOLDHART, OF SHERMAN, NEW YORK.

IMPROVEMENT IN MILK-COOLERS.

Specification forming part of Letters Patent No. 179,783, dated July 11, 1876; application filed June 3, 1876.

To all whom it may concern:

Be it known that I, JOHN H. GOLDHART, of Sherman, in the county of Chautauqua and State of New York, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 1:
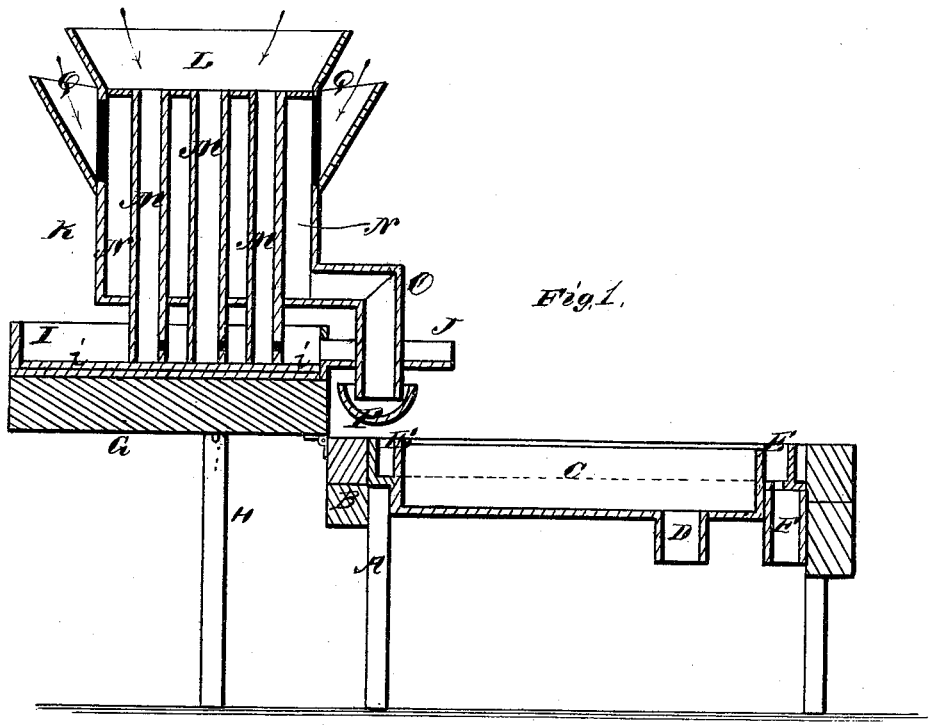
Figure 2:
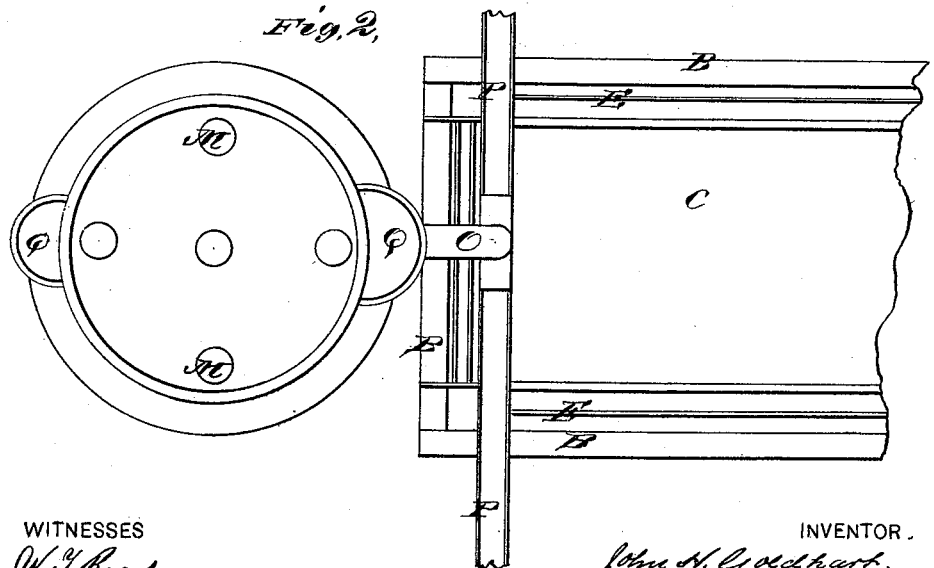

Figure 1 of the drawings is a representation of a longitudinal vertical section of my milk-cooler, and Fig. 2 is a plan view of the same.

This invention relates to milk-coolers; and it consists in devices hereinafter particularly described and claimed.

In the annexed drawings, A A designate standards, which support a frame, B, on the inside of which is secured a tank, C, provided with an outlet-pipe, D, and double walls E E. The spaces between these double walls connect, so as to allow a continuous circulation of cooling fluid, and they are provided with one or more outlet-pipes, F. G is a platform hinged to frame B, and supported by hinged prop H. On platform G I place a flat-bottomed basin or similar receptacle, I, provided with an outlet-pipe, J, which projects over tank C. The inside of this receptacle may be lined with some textile fabric, $i\ i$, to impede the flow of milk, as hereinafter described. K is a milk-receptacle, consisting of upper basin L, into which the milk is first poured, and tubes M, through which it passes. These tubes stand in basin I, and are surrounded by water, which is contained in receptacle or water-jacket N. Said receptacle or water-jacket is rigidly attached to milk-receptacle K, and supported by the tubes M thereof. From the lower part of water-jacket N extends an outlet-pipe, O, which is bent, and terminates in a perforated trough, P, which extends over and supplies the water-spaces about tank C. At the upper part of water-jacket N I provide funnels or inlets Q Q, whereby the water is supplied.

The operation is as follows: The water, being poured in at Q Q, passes around tubes M, cooling the same; thence through pipe O and trough P into the water-spaces between walls E E, surrounding tank C, and thence out by outlet F. The milk is poured into upper basin L, whence it passes through tubes M into basin I. It is retarded in its flow by the lining $i\ i$, of textile fabric, on the bottom of the inside of said basin, and thereby is subjected for some time to the cooling action of the water in the jacket. Thence the milk passes into main tank C, where it is still further cooled by the water.

What I claim as new, and desire to secure by Letters Patent, is—

In a milk-cooler, the combination of a milk-receptacle, K, provided with tubes M, with water-jacket N, basin I, and lining $i\ i$ of said basin, substantially as and for the purpose set forth.

In testimony that I claim the above I have hereunto subscribed my name in the presence of two witnesses.

JOHN H. GOLDHART.

Witnesses:
 CARLOS STEBBINS,
 B. J. COFFIN.